United States Patent [19]
Witkowski

[11] 3,736,690
[45] June 5, 1973

[54] COMBINATION BOBBER-SINKER
[76] Inventor: Sigmund Witkowski, 312 N. Washington Street, Westmont, Ill. 60559
[22] Filed: May 24, 1971
[21] Appl. No.: 146,014

[52] U.S. Cl. ............43/43.14, 43/44.9, A01k/93/00
[51] Int. Cl. ...............................................A01k 95/00
[58] Field of Search................43/43.14, 44.9, 44.91, 43/42.35, 42.22, 43.15

[56] References Cited
UNITED STATES PATENTS

| | | | |
|---|---|---|---|
| 3,608,229 | 9/1971 | Ross | 43/43.14 |
| 2,669,054 | 2/1954 | Smith, Sr. | 43/44.9 X |
| 2,605,576 | 8/1952 | Young, Jr. et al. | 43/43.14 X |
| 3,353,294 | 11/1967 | Mundorff et al. | 43/44.91 |
| 2,230,456 | 2/1941 | Henze | 43/43.14 |
| 2,741,864 | 4/1956 | Shotton | 43/44.9 |
| 2,958,153 | 11/1960 | Yerman et al. | 43/43.14 |
| 3,460,285 | 8/1969 | Perkins | 43/44.9 |
| 3,670,447 | 6/1972 | Wohead | 43/43.14 |

Primary Examiner—Louis G. Mancene
Assistant Examiner—James H. Czerwonky
Attorney—Hogren, Wegner, Allen, Stellman & McCord

[57] ABSTRACT

A combination fishing bobber-sinker. The bobber-sinker includes a bullet-shaped float trailing a removable, apertured weight receiving chamber. A passageway extends through both the float and the chamber for receipt of a fishing line. The float alone may be used as a bobber or the combined float and weight receiving chamber may be used as a bobber with the buoyancy controlled by the number of weights received in the latter. Alternatively, the entire assemblage may be used as a sinker with the bullet shape of the head tending to easily slip past underwater obstructions during trolling or the like. The lower portion of the chamber has an elevated bottom platform to support the weights.

7 Claims, 3 Drawing Figures

PATENTED JUN 5 1973
3,736,690
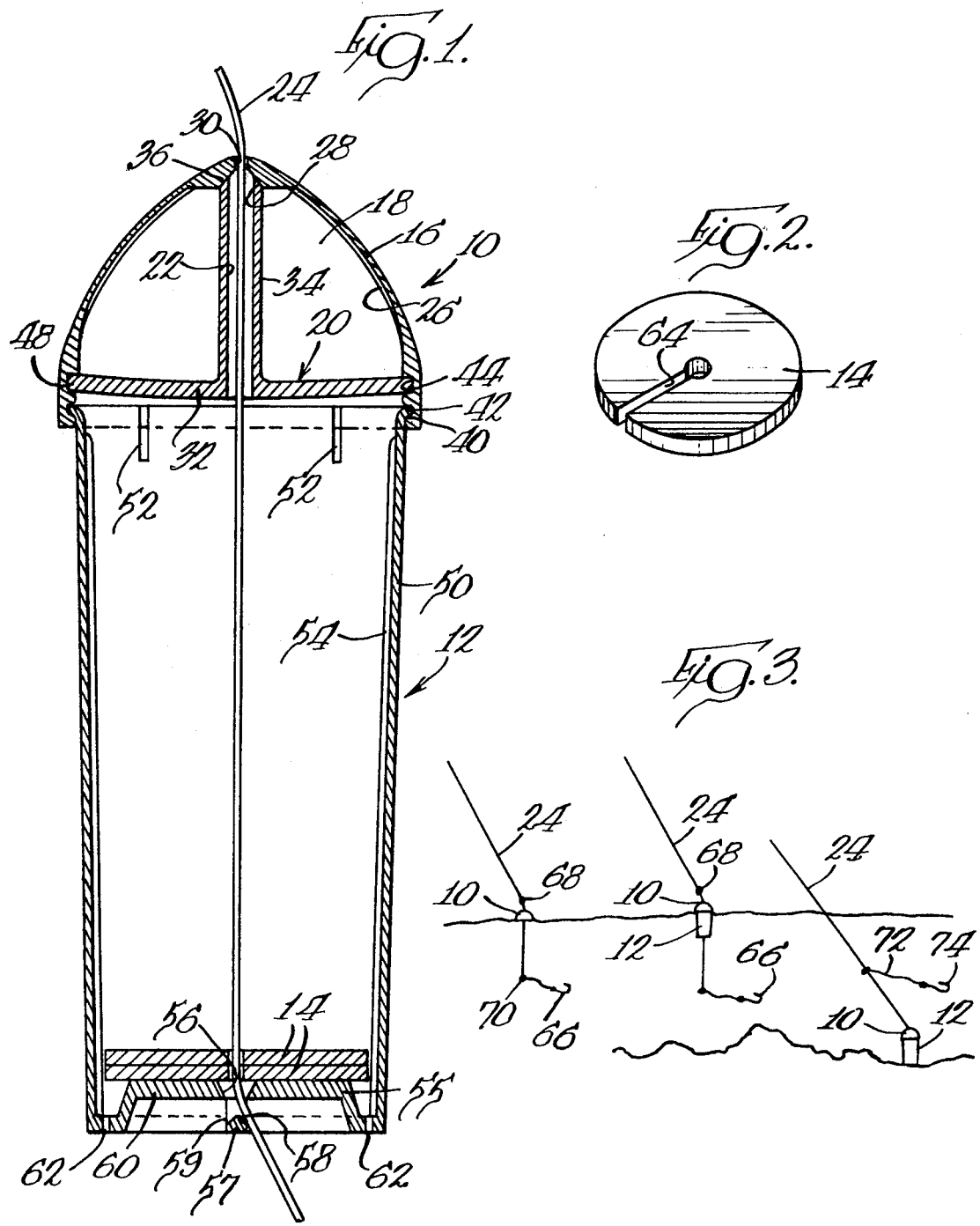
Inventor:
Sigmund Witkowski
By Hofgren, Wegner,
Allen, Stellman & McCord
Attys

COMBINATION BOBBER-SINKER

BACKGROUND OF THE INVENTION

This invention relates to fishing equipment and more particularly, to an improved combination bobber-sinker construction.

The sport of fishing has for many years been enjoyed by multitudes and over the course of history of the development of the sport, many different types of equipment have evolved for practicing the same. All too frequently, the equipment is designed exclusively for a single use. For example, equipment designed for still fishing may be unsuitable for use in casting or trolling, and vice versa. As a result, the fisherman has been required to accumulate different sets of equipment, each unique to a particular type of fishing.

SUMMARY OF THE INVENTION

The principal object of the invention is to provide a new and improved item of fishing equipment that is susceptible to use in a plurality of different types of fishing to eliminate unnecessary equipment. More specifically, it is an object of the invention to provide a new and improved combination bobber-sinker which may be used in still fishing, casting and trolling.

The exemplary embodiment of the invention achieves the foregoing object through a construction employing a float defined by a bullet-shaped head having a cavity closed by a bottom to provide a water-tight seal for the cavity. A weight receiving chamber for receiving one or more weights is provided with means for releasable connection to the float head so that the buoyancy of the resulting structure can be controlled by the weight received in the chamber. The structure also includes a passageway extending through the length of the same for passage of a fishing line therethrough while the weight receiving chamber is provided with apertures top and bottom so as to permit free ingress and egress of water through the same.

The float alone may be used as a bobber for still fishing or, the combined structures may be used as a bobber so long as weight in the weight receiving chamber is not sufficient to sink the same. Alternatively, with sufficient weight in the weight receiving chamber, the same may be used as a sinker for trolling or the like with the bullet-shaped head enabling the same to pass easily over obstructions on the bottom.

Other objects and advantages will become apparent from the following specification taken in conjunction with the accompanying drawings.

DESCRIPTION OF THE DRAWINGS

FIG. 1 is a vertical section of a combination fishing bobber-sinker made according to the invention;

FIG. 2 is a perspective view of a preferred form of weight that may be employed with the combination fishing bobber-sinker; and FIG. 3 is a schematic illustrating different ways in which the combination fishing bobber-sinker may be employed in the sport of fishing.

DESCRIPTION OF THE PREFERRED EMBODIMENT

An exemplary embodiment of a fishing bobber-sinker is illustrated in FIG. 1 and is seen to be comprised of a float, generally designated 10 to which a weight receiving chamber, generally designated 12 is releasably secured. Within the chamber 12, one or more weights 14 may be received.

The float 10 is comprised of a bullet-shaped head 16 having an internal cavity 18 sealed by a bottom member 20. A passageway 22 for receipt of a fishing line 24 extends through the float 10.

The head 16 includes radially spaced stiffening ribs 26 within the cavity 18. In addition, the upper end of the cavity 18 terminates in a conical recess 28 and an aperture 30 through which the line 24 may pass. The bottom 20 includes a base 32 from which a tubular element 34 extends to define the passageway 22. The tubular element includes a frusto-conical shaped upper end 36 which is matingly received in the recess 28 to establish a water-tight fit. The head 16 also includes a peripheral groove 40 which may snap fit with an outwardly extending peripheral bead 42 at the upper edge of the weight receiving chamber 12 to releasably secure the two together.

To positively retain the base 32 within the head 16, the latter includes an inwardly facing peripheral groove 44 located just above the groove 40 to snap fittingly receive the peripheral edge 48 of the base 32.

preferably, the float 10 may be constructed without requiring special operations to provide a water-tight seal. This may be accomplished by fabricating the tubular element 34 so as to have a length slightly greater than the vertical distance between a plane extending through the upper peripheral edge of the groove 34 and the conical recess 28. As a result, when the base 32 is received in the groove 44, the length of the tubular element 34 will cause the base to bow slightly downwardly and the resulting tensioning of the material will force the upper conical end 36 of the tubular element 34 tightly into the conical recess 28 to provide a water tight seal. And the snap fit receipt of the base 32 within the head 16 will insure a water-tight seal at the lower interface of the head 16 and the base 32. Thus, sealing techniques as, for example, solvent welding, need not be employed.

The weight receiving chamber 12 is formed of an elongated tubular member 50 which is open at its upper end and includes radially spaced, downwardly extending slots 52 to permit entry of the water into the chamber 12. Within the chamber 12 are a plurality of stiffening ribs 54 at radially spaced locations.

The lower end of the chamber 12 is defined by a base 55 having a central, tapered aperture 56 through which the line 24 may pass after leaving the passageway 22 of the head 10. Below the point of emergence of the aperture 56 through the base 55 is an integral eye 57 having tapered upper surfaces 58 and 59. It will be appreciated that the taper of the aperture 56 as well as the presence of the tapered surfaces 58 and 59 on the eye 57 permit easy threading of the line 24 through the same. The eye 57 may be used to positively secure the line 24 to the structure for positioning purposes if desired.

Intermediate the aperture 56 and the wall 50 is a ringshaped platform 60 and a plurality of radially spaced bores 62. The purpose of the platform 60 is to maintain the weights 14 in an elevated position above the aperture 56 and the bores 62 so as to permit free drainage of water through the same from the chamber 12.

Turning now to FIG. 2, each weight 14 is seen to be comprised of a circular disc having an elongated keyhole slot 64 extending towards its center so that the same may easily be fit about a line 24 passing through the chamber 12.

Depending upon the desired attitude of the overall assemblage in the water when the same is being used as a bobber, one or more of the weights 14 may be employed. Of course, the greater the number of weights, the lower the same will ride in the water. If a sufficient number of weights are added, the same will serve as a sinker with the bullet-shape of the head 16 allowing the same to easily bypass underwater obstructions.

Turning now to FIG. 3, the manner of using the same will be illustrated. As shown at the left-hand side of the Figure, the float 10 alone is being used as a bobber in conjunction with a line 24 trailing a hook 66. To control the length of the line 24 below the float 10, any suitable obstruction 68 may be placed on the line 24 just above its point of entry into the float 10 so as to limit downward movement of the line 24 therethrough and thereby control the height of the hook 66 below the surface.

In the center illustration, both the float 10 and the chamber 12 are employed similarly. The use of the chamber 12 in such a situation provides increased stability for the assemblage insofar as the slots 52 and apertures 62 permit free flowing of water into the chamber 12 when the same first hits the water so that the total assemblage will assume a vertical position due to the dead weight of the chamber 12. When the total assemblage is removed from the water, the same openings permit the water to rapidly flow out of the chamber.

When used as shown in the left-hand and center portions in FIG. 3, the assemblage has a significant advantage over typical bobber constructions wherein the same are rigidly fastened at one point to the line 24. Specifically, it will be appreciated that the assemblage for the float alone may move along the line 24 between the obstruction 68 and a point of attachment 70 of the line 24 to a leader bearing the hook 66 or the like so that, when casting, the float 10 or the total assemblage will be adjacent the point 70 so that all of the weight is near the object to be cast and there is not a significant length of excess line between the bobber and the hook increasing the difficulty of casting and increasing the danger to those standing around the fisherman making the cast. When the cast has been completed, the line 24 will slip through the float 10 or the assemblage until the obstruction 68 is encountered at which time the desired height of the hook 66 below the surface will automatically be assumed. Thus, the assemblage not only is easy to cast, but reduces the danger heretofore present when casting baited hooks secured to lines wherein conventional bobbers are employed.

The right-hand illustration in FIG. 3 shows another use of the combined fishing bobber-sinker. As illustrated, the overall assemblage of the float 10 and the weight receiving chamber 12 is riding on the bottom due to the presence of a sufficient number of weights 14 within the weight receiving chamber so that the buoyancy of the float 10 is overcome. At a desired point above the point of attachment of the line 24 to the assemblage, a leader 72 trailing a baited hook or a lure 74 may be attached for trolling purposes. It will be appreciated that during such trolling with the assemblage riding on the bottom, if an underwater obstruction is encountered, the bullet-shaped head of the float 10 will tend to cause the same to cam itself around the obstruction to reduce the possibility of snags.

It should be understood that the combination fishing bobber-sinker is not limited to use with weights of the type specifically illustrated although such weights are preferable. For example, other conventional fishing weights could be employed in the chamber or, for that matter, ordinary pebbles or small rocks could be used in lieu thereof so long as the same are of sufficient size as to be incapable of blocking the bores 62 to prevent drainage of water from the body.

I claim:

1. A combination fishing bobber-sinker comprising: a float comprising a water-tight chamber defined by a bullet-shaped head having an internal cavity and a base closing said cavity, and means mounted in said chamber and defining a passage sealed from said chamber and extending through said float cavity for receipt of a fishing line, said float having a density less than that of water; means defining a weight receiving and retaining chamber having an open upper portion and a closed lower portion and being of a size sufficient to receive and retain at least one weight capable of overcoming the buoyancy of said float, said lower portion having an elevated bottom platform to support said weight, said weight receiving chamber being elongated and including a plurality of apertures, some of said apertures in said upper portion and some in said lower portion, to permit free ingress and egress of the water into and out of said weight receiving chamber, said weight receiving chamber further including at least one aperture in said platform to permit said fishing line to pass therethrough; and means establishing a releasable connection between the upper edge of said weight receiving chamber and the lower end of said float whereby said float alone may be used as a bobber, said float and said weight receiving chamber may be used as a bobber having controlled buoyancy determined by the weights received in said weight receiving chamber or may be used as a sinker.

2. A combination fishing bobber-sinker of claim 1 wherein one of said float and said weight receiving chamber includes a bead and the other of said float and said weight receiving chamber includes a notch for receiving the bead to define said releasable connection establishing means.

3. The combination fishing bobber-sinker of claim 1 wherein the cavity within said head terminates at its upper end in a conical recess and said base includes an upwardly extending tube having its upper end terminating in a mating conical shape to snugly fit said recess.

4. The combination fishing bobber-sinker of claim 3 wherein the lower end of said head includes a peripheral bead extending about said cavity for snap-fit receipt and retention of said base.

5. The combination fishing bobber-sinker of claim 4 wherein each of said cavity and said weight receiving chamber are provided with a plurality of longitudinally extending stiffening ribs.

6. The combination fishing bobber-sinker of claim 3 wherein said upwardly extending tube has a length sufficient to cause said base to bow slightly when the latter is received in said head whereby the inherent resilience of said base exerts a force to cause the upper end of said tube to sealingly engage said conical recess.

7. The combination fishing bobber-sinker of claim 1 further including a plurality of weights, said weights being configured in the form of a circular disc and having an inwardly extending keyhole slot therein for receipt of a fishing line.

* * * * *